Figure 1:
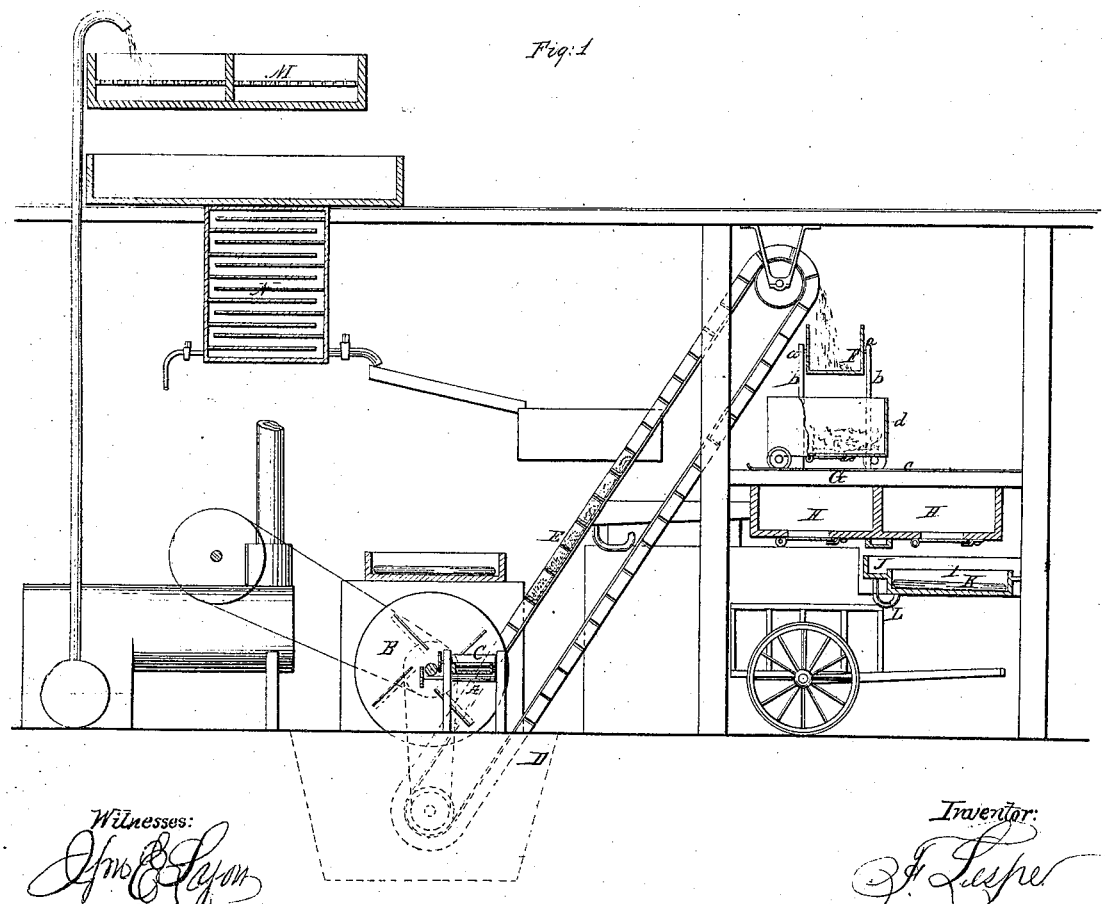

T. Lespes,
Manufacture of Sugar,
N° 52,424.        Patented Feb. 6, 1866.

UNITED STATES PATENT OFFICE.

T. LESPÉS, OF COLD SPRING, NEW YORK.

IMPROVEMENT IN THE MANUFACTURE OF SUGAR.

Specification forming part of Letters Patent No. 52,424, dated February 6, 1866.

*To all whom it may concern:*

Be it known that I, TITUS LESPÉS, of Cold Spring, in the county of Putnam and State of New York, have invented a new and useful Improvement in the Manufacture of Sugar; and I do hereby declare that the following is a full, clear, and exact description thereof, which will enable others skilled in the art to make and use the same, reference being had to the accompanying drawings, forming part of this specification, in which—

Figure 1 represents a sectional side elevation of this invention. Fig. 2 is a plan or top view of the same.

Similar letters of reference indicate like parts.

This invention relates to a new process of treating sugar-cane or other plants containing sugar, in which the canes or other plants are first cut up in short pieces, instead of passing the same through rollers, and thereby such impurities as gluten, starch, albumen, &c., contained in the plant are prevented from mixing with the sugar. The pieces obtained by this first operation are boiled in suitable macerators for the purpose of separating the albumen, vegetable acids, and other impurities, the juice being filtered by the pieces of cane, and from the macerators the juice is brought into a wooden pan surrounded by an inclined trough, which serves to catch the scum which is retained in said trough, whence it can be readily removed, whereas the juice still mixed with the scum is conducted back to the pan. After all the feculencies have been separated from the juice it is raised to a reservoir, the bottom of which forms a filter, through which it passes into a decolorizing-column composed of a vertical box containing a series of zigzag partitions. In passing through this decolorizing-column in a zigzag course the sirup is met by a current of sulphurous-acid gas running in an opposite direction, and by the action of the sulphurous-acid gas the decolorization is effected, and then the juice is evaporated and boiled down in wooden pans and finally treated as usual.

A represents a trough, made of wood or other suitable material, over which the cane is fed to a cutter-wheel, B, and a pair of feed-rollers, C, placed between the end of the trough and the cutter-wheel, render the cane self-feeding.

The pieces of cane, as the same are cut off, drop down into a box or receiver, D, and an elevator, E, serves to carry the same up and to dump them in a trough, F. This trough is hung on pivots $a$, which have their bearings in standards $b$, rising from a floor or platform. G, between the macerators H. Four (more or less) such macerators are used, and said macerators are situated between tracks $c$, on which moves a car, $d$, which can be brought under the tilting trough F, and which is provided with a trap-bottom, so that its contents can be readily dumped into either of the macerators. By means of the tilting trough the pieces of cane can be discharged on either side, and either set of macerators can be changed.

Said macerators are partially filled with cane, and a sufficient quantity of hot water is let in to cover the cane, the cane being retained in the water by a wooden cover perforated with holes; then the temperature is raised to about 212° Fahrenheit, and kept there for a sufficient length of time to disintegrate the plant, from fifteen to twenty minutes being sufficient for ordinary cane. By the action of the heat the vegetable acids are driven out, the albumen is coagulated, and the juice, after having thus been partially cleaned, is sent by a monte jus to a second macerator, and so on until it comes out in the strength of four, six, eight, and ten degrees very pure, the pieces of cane acting as filters, which retain the impurities.

From the last macerator or macerators the juice is transferred to the rectifying-pan I, which is made entirely of wood and surrounded by a trough, J, which inclines toward one point. In the bottom of said pan are steam-heating pipes K, and the juice is let in to the depth of about one foot, (more or less,) and by applying heat and lime or other suitable material or materials the defecation is effected. The froth rising from the juice passes out into the inclined trough and runs down to the lowest point thereof, and a curved pipe, L, extending from said lowest point of the trough back into the pan, allows the juice still mixed with the froth to return to the pan, the froth being retained in the trough by a piece of wire-gauze, which covers the mouth of the curved pipe.

After having been passed through rectifying-pan the juice, being thoroughly defecated, is elevated by the monte jus to the reservoir M, the bottom of which forms a filter through which the sirup runs down to the decoloring apparatus N. This apparatus is composed principally of a box which is provided with a series of zigzag partitions, causing the sirup to run down in a zigzag course, while a current of sulphurous-acid gas is made to pass up through said box in an opposite direction to the juice. From the decolorizing apparatus the juice is returned to the evaporator O, which, being larger than the defecator, is only partially filled, and which is made of wood provided with an inclined trough like the defecator, so that the scum rising from the juice is readily separated, and the juice still mixed with said scum is permitted to return to the pan through the curved pipe L'. During this entire operation no hand-labor is required, and when the juice has been boiled down it is placed into the finishing-pan P and finally boiled until the desired consistency is obtained. From the finishing-pan the sirup is let into the crystallizing-tanks and then put into the centrifugal machine, and finally treated as usual.

What I claim as new, and desire to secure by Letters Patent, is—

1. The within-described process of extracting the juice from cane or other plants containing sugar by cutting the same up into short pieces and boiling these pieces in suitable macerators, substantially in the manner and for the purposes set forth.

2. Using the pieces of cane during the macerating process as filtering medium, as and for the purpose described.

3. The tilting trough F, in combination with the car $d$, macerators H, and elevator E, constructed and operating substantially as and for the purpose set forth.

4. The pans I O, made entirely of wood, and provided with inclined troughs J, substantially as and for the purpose described.

5. The curved pipes L L', in combination with the pans I O and their inclined troughs J, constructed and operating substantially as and for the purpose set forth.

6. The decolorizing-column N, constructed and operating substantially as and for the purpose described.

TITUS LESPÉS.

Witnesses:
F. RUMPF,
WILLIAM HUMPHREYS, Jr.